United States Patent [19]
Ohashi et al.

[11] Patent Number: 6,018,205
[45] Date of Patent: Jan. 25, 2000

[54] VEHICLE ALTERNATOR

[75] Inventors: Atsushi Ohashi; Yoshihito Asao, both of Tokyo, Japan

[73] Assignee: Mitsubishi Denki Kabushiki Kaisha, Tokyo, Japan

[21] Appl. No.: 09/209,445

[22] Filed: Dec. 11, 1998

[30] Foreign Application Priority Data

Jul. 21, 1998 [JP] Japan ................... 10-205140

[51] Int. Cl.⁷ .................................. H02K 9/00
[52] U.S. Cl. ................. 310/52; 310/58; 310/59
[58] Field of Search ................ 310/52, 59, 58; 29/596

[56] References Cited

U.S. PATENT DOCUMENTS

| | | | |
|---|---|---|---|
| 4,295,067 | 10/1981 | Binder et al. | 310/52 |
| 4,963,776 | 10/1990 | Kitamura | 310/64 |
| 5,729,063 | 3/1998 | Adachi et al. | 310/68 D |
| 5,903,073 | 5/1999 | Mukai | 310/64 |

FOREIGN PATENT DOCUMENTS 7-170695  7/1995  Japan.

*Primary Examiner*—Thomas M. Dougherty
*Assistant Examiner*—Joseph Waks
*Attorney, Agent, or Firm*—Sughrue, Mion, Zinn Macpeak & Seas, PLLC

[57] ABSTRACT

A vehicle alternator includes a case having a pair of brackets placed back-to-back, in which ribs are disposed, which define ventilation windows (29; 74) in a bracket body. The ribs serve as heat passage members (54, 60; 73), which have higher thermal conductivity than the bracket body and are partially embedded in the bracket body. Therefore, heat resistance in the heat transfer passage between the stator and the ventilation windows is reduced, and heat generated by the stator is expelled efficiently from the ventilation windows to the outside air, and the temperature of the stator can be reduced.

10 Claims, 8 Drawing Sheets

VEHICLE ALTERNATOR

BACKGROUND OF THE INVENTION

1. Field of the Invention

The present invention relates to a vehicle alternator which is provided with a case, which comprises a pair of brackets placed back-to-back, in which ribs are disposed, which define ventilation windows in the bracket body.

2. Description of the Related Art

FIG. 8 is a front elevation of a conventional vehicle alternator and FIG. 9 is a cross-section along line IX—IX in FIG. 8. The pulley and shaft in FIG. 9 have been omitted in FIG. 8.

This vehicle alternator comprises: a case, which comprises an aluminum front bracket 1 and a rear bracket 2; a shaft 6, which is disposed in the case and to one end of which a pulley 4 is secured; a roundel-shaped rotor 7, which is secured to the shaft 6; fans 5, which are secured to both sides of the rotor 7; a stator 8, which is secured to the inner wall of the case; slip rings 9, which are secured to the other end of the shaft 6 and supply electric current to the rotor 7; a pair of brushes 10, which move in contact with the slip rings 9; brush holders 11, which accommodate the brushes 10; a rectifier 12 in electrical contact with the stator 8; a heat sink 36, which is fitted into the brush holder 11; and a regulator 17, which is secured in contact with the heat sink 36 to regulate the magnitude of the alternating voltage generated in the stator 8.

The rotor 7 comprises: a rotor coil 13, which generates a magnetic flux when an electric current is passed through it; and a pole core 14, which is disposed so as to cover the rotor coil 13 and in which magnetic poles are produced by the magnetic flux generated by the rotor coil 13. The pole core 14 comprises a first pole core assembly 18 and a second pole core assembly 19 which are mutually interlocked. The first pole core assembly 18 and the second pole core assembly 19 are made of iron, and have claw-shaped magnetic poles 20, 21, respectively. Each of the adjacent claw-shaped magnetic poles 20, 21 is disposed such that they define prescribed interpole spaces, so as to prevent magnetic flux from leaking from between the claw-shaped magnetic poles, and to define a cooling ventilation passage to cool the rotor coil 13.

The stator 8 comprises: a stator core 15; and a stator coil 16, which is a conductor wound around the stator core 15 in which an alternating current is generated in response to changes in the magnetic flux in the rotor coil 13 resulting from the rotation of the rotor 7.

The rectifier 12 comprises: a diode 26, which converts the alternating current generated in the stator 8 to a direct current; and a heat sink 27, for dissipating heat generated in the diode 26.

A plurality of exhaust windows 29, which are defined by a plurality of ribs 28, are disposed around the circumference of the bracket body 80 in the front bracket 1. A plurality of intake windows 34 are disposed radially inwards from the exhaust windows 29. Bore holes 30 are disposed in four places around the circumference of the bracket body 80 at intervals of 90 degrees. Bolts 31 pass through these bore holes 30 and engage the rear bracket 2, and the rear bracket 2 and the front bracket 1 support the stator core 15 from both sides. Mounting holes 33 are formed in each of a pair of V-shaped mounting legs 32. Bolts (not shown) pass through these mounting holes 33 and engage an engine body (not shown), and secure the vehicle alternator to the engine body.

Like the front bracket 1, the rear bracket 2 also has ribs 28, exhaust windows 29, intake windows 34, and mounting holes 33.

In a vehicle alternator of the above construction, a current is supplied by a battery (not shown) through the brushes 10 and slip ring 9 to the rotor coil 13, and a magnetic flux is generated, whereby the claw-shaped magnetic poles 20 of the first pole core assembly 18 are polarized with a north-seeking (N) pole, and the claw-shaped magnetic poles 21 of the second pole core assembly 19 are polarized with a south-seeking (S) pole. At the same time, the pulley 4 is driven by the engine and the rotor 7 is rotated by the shaft 6, so that a rotating magnetic field is imparted to the stator coil 16 and electromotive force is generated in the stator coil 16. This alternating electromotive force is converted to a direct current by means of the rectifier 12, its magnitude is regulated by the regulator 17, and the battery is recharged.

The rotor coil 13 and stator coil 16 continuously generate heat while they generate power. At the same time, a fan 5 rotates to remove the heat generated by power generation, and in the front bracket 1 and rear bracket 2, cooling air passes in through the intake windows 34 and is expelled to the outside through the exhaust windows 29, as shown by arrows A in FIG. 9.

FIG. 10 shows a heat transfer circuit from the stator 8 to the cooling air passing through the exhaust windows 29. In the figure, $T_s$ is the temperature (K) of the stator 8, $R_1$ is the heat resistance (K/W) between the stator core 15 and the insertion portion 35 of the front bracket 1, which is where the stator core 15 is inserted into the front bracket 1, $R_2$ is the heat resistance (K/W) between the insertion portion 35 and the root portions 28a of the ribs 28, $R_3$ is the heat resistance (K/W) of the ribs 28, and $T_a$ is the temperature (K) of the cooling air.

Some of the heat from the stator 8 is transferred through the above heat transfer circuit and is finally transferred to the cooling air. From this heat transfer circuit, the temperature increase in the stator 8 ($T_s - T_a$) is given by $Q \times (R_1 + R_2 + R_3) = Q \times R$, where Q is the heat flux (W) of the stator 8.

In order to keep the temperature increase in the stator 8 as low as possible in a vehicle alternator of the above construction when the heat flux Q of the stator 8 is constant, it is necessary to reduce the value of the above heat resistance R.

The problem is that the bracket body 80 in the front bracket 1 and the bracket body 80 in the rear bracket 2 are made of aluminum, which does not have very high thermal conductivity, and the ribs 28, which constitute the window frames of the exhaust windows 29 are also made of aluminum, and therefore heat resistance R is great, the temperature of the stator 8 increases, and power output must be reduced.

Japanese Patent Laid Open No. (HEI) 7-170695 discloses a construction in which a heat pipe of high thermal conductivity is used to dissipate heat in a generator body, but the problem is that the heat dissipation portion, which dissipates heat from the heat pipe to the outside is disposed on the outside of the generator body and makes the body of the vehicle alternator too big.

SUMMARY OF THE INVENTION

The present invention aims to solve the above problems and an object of the present invention is to provide a vehicle alternator capable of suppressing temperature increases and improving power generation capacity.

To this end, according to the present invention, there is provided a vehicle alternator comprising: a case, which comprises a pair of brackets placed back-to-back, in which ribs are disposed, which define ventilation windows in a bracket body; a shaft, which is disposed in said case such that it can rotate freely; a rotor, which is secured to said shaft and has a rotor coil, which generates a magnetic flux when an electric current is passed through it, and a pole core, which is disposed so as to cover the rotor coil and in which magnetic poles are produced by the magnetic flux generated by the rotor coil; and a stator, which is secured within said case and has a stator core and a stator coil, which is a conductor wound around the stator core in which an alternating current is generated by the rotating magnetic field of the rotor coil resulting from the rotation of said rotor; wherein said ribs comprise heat passage members, which have higher thermal conductivity than the bracket body and are partially embedded in the bracket body.

DETAILED DESCRIPTION OF THE PREFERRED EMBODIMENTS

Embodiment 1

Figure 1:
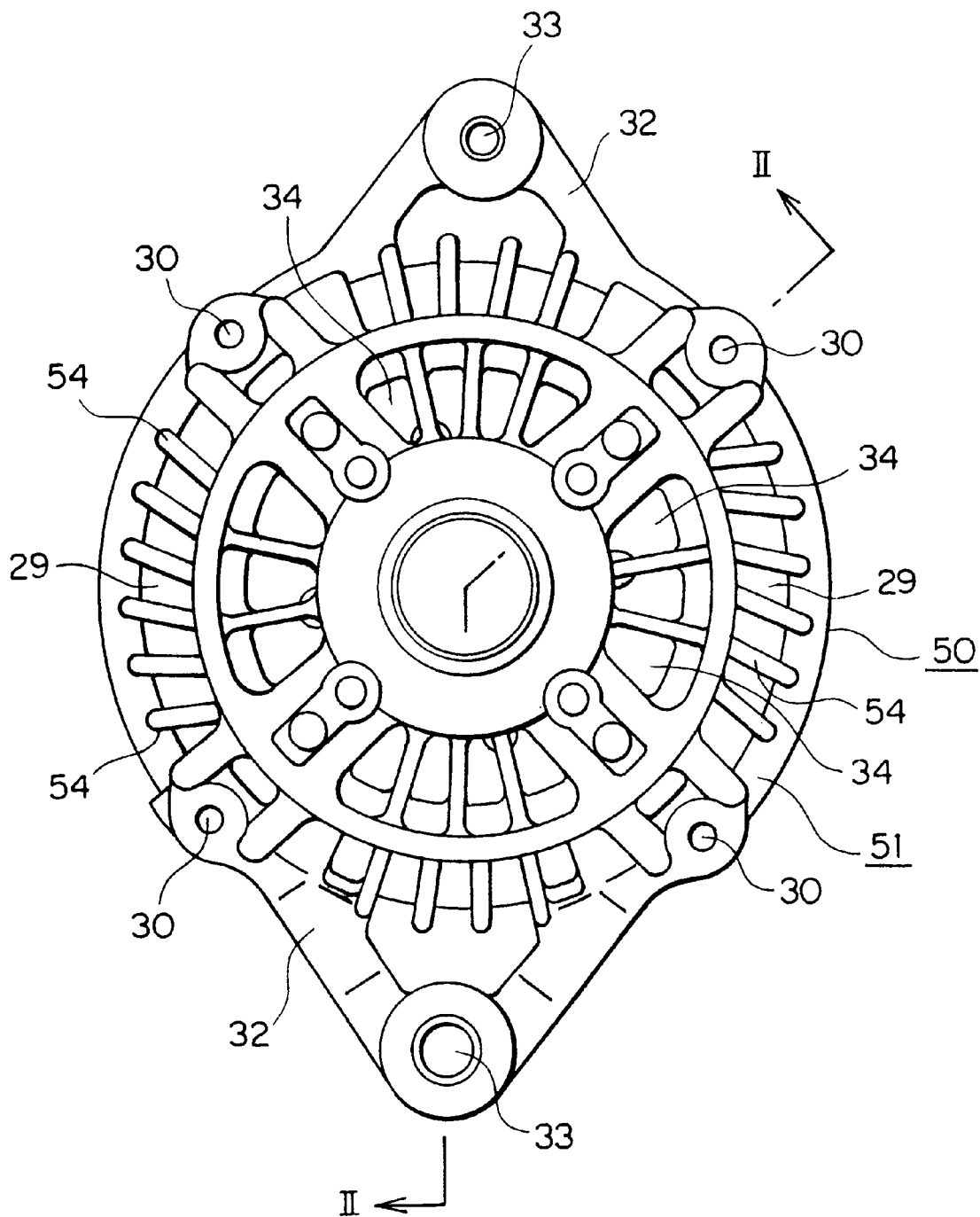
FIG. 1 is a front elevation of the vehicle alternator according to Embodiment 1 of the present invention.
Figure 2:
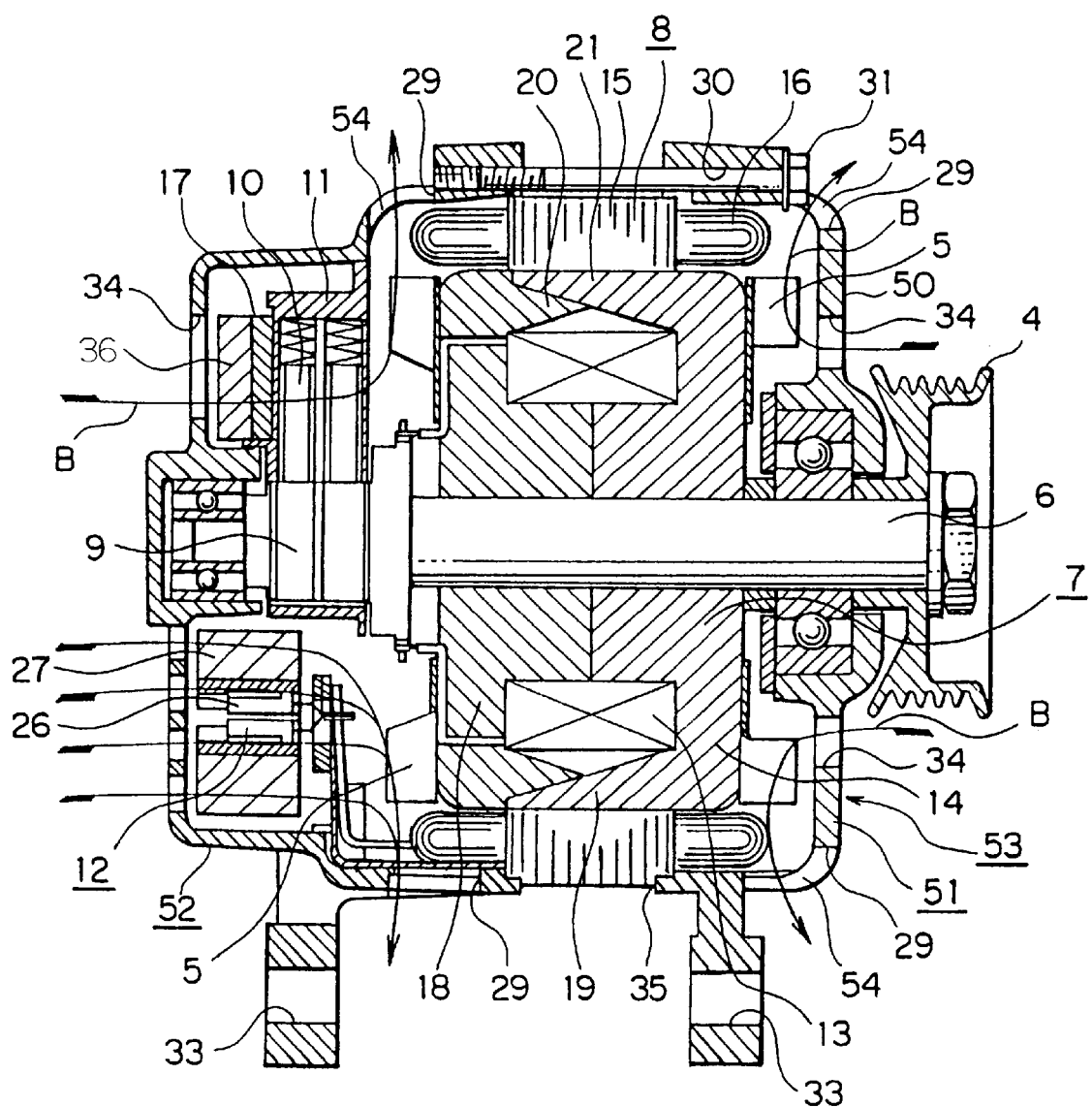
FIG. 2 is a cross-section along line II—II in FIG. 1.
Figure 3:
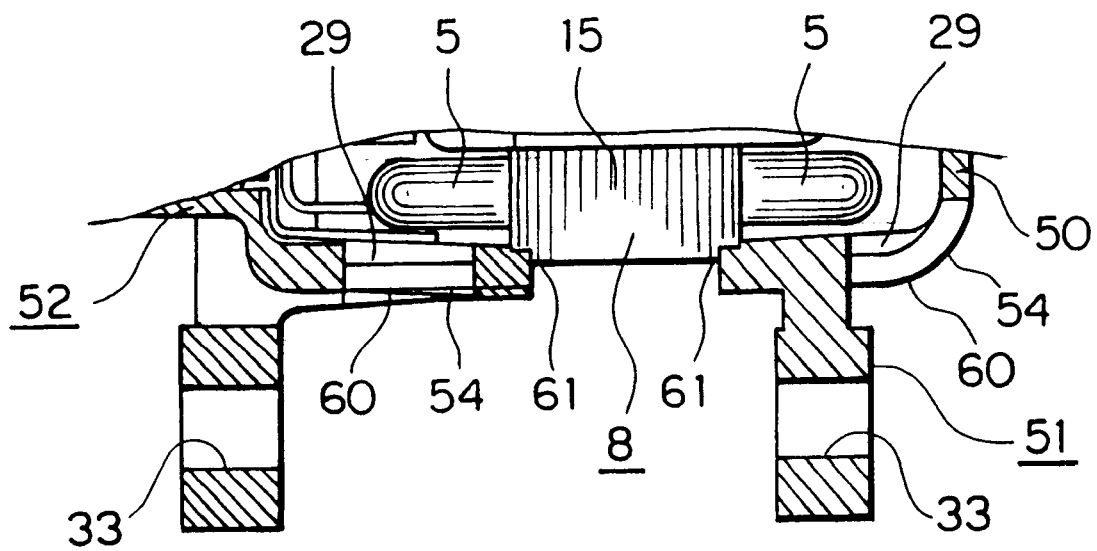
FIG. 3 is a partial enlargement of FIG. 2.

FIG. 1 is a front elevation of the vehicle alternator according to Embodiment 1 of the present invention, FIG. 2 is a cross-section along line II—II in FIG. 1, and FIG. 3 is a partial enlargement of FIG. 2. The pulley and shaft in FIG. 2 have been omitted in FIG. 1.

This vehicle alternator comprises: a case 53, which comprises a front bracket 51 and rear bracket 52; a shaft 6, which is disposed in the case 53 and to one end of which a pulley 4 is secured; a roundel-shaped rotor 7, which is secured to the shaft 6; fans 5, which are secured to both sides of the rotor 7; a stator 8, which is secured to the inner wall of the case 53; slip rings 9, which are secured to the other end of the shaft 6 and supply electric current to the rotor 7; a pair of brushes 10, which move in contact with the slip rings 9; brush holders 11, which accommodate the brushes 10; a rectifier 12 in electrical contact with the stator 8; a heat sink 36, which is fitted into the brush holder 11; and a regulator 17, which is secured in contact with the heat sink 36 to regulate the magnitude of the alternating voltage generated in the stator 8.

The rotor 7 comprises: a rotor coil 13, which generates a magnetic flux when an electric current is passed through it; and a pole core 14, which is disposed so as to cover the rotor coil 13 and in which magnetic poles are produced by the magnetic flux generated by the rotor coil 13. The pole core 14 comprises a first pole core assembly 18 and a second pole core assembly 19 which are mutually interlocked. The first pole core assembly 18 and the second pole core assembly 19 are made of iron, and have claw-shaped magnetic poles 20, 21, respectively. Each of the adjacent claw-shaped magnetic poles 20, 21 is disposed such that they define prescribed interpole spaces, so as to prevent magnetic flux from leaking from between the claw-shaped magnetic poles, and to define a cooling ventilation passage to cool the rotor coil 13.

The stator 8 comprises: a stator core 15; and a stator coil 16, which is a conductor wound around the stator core 15 in which an alternating current is generated in response to changes in the magnetic flux in the rotor coil 13 resulting from the rotation of the rotor 7.

The rectifier 12 comprises: a diode 26, which converts the alternating current generated in the stator 8 to a direct current; and a heat sink 27, for dissipating heat generated in the diode 26.

A plurality of ribs 54, which define a plurality of exhaust windows 29, which are ventilation windows, are disposed around the circumference of the bracket body 50 in the front bracket 51. Whereas the bracket body 50 is composed of aluminum, the ribs 54 are composed of copper, which has higher thermal conductivity than aluminum. A plurality of intake windows 34 are disposed radially inwards from the exhaust windows 29. Bore holes 30 are disposed in four places around the circumference of the front bracket 51 at intervals of 90 degrees. Bolts 31 pass through these bore holes 30 and engage the rear bracket 52, and the rear bracket 52 and the front bracket 51 support the stator core 15 from both sides. Mounting holes 33 are formed in each of a pair of V-shaped mounting legs 32. Bolts (not shown) pass through these mounting holes 33 and engage an engine body (not shown), and secure the vehicle alternator to the engine body.

The ribs 54 comprise copper heat passage members 60, which have one end embedded in the bracket body 50 and the other end embedded in the insertion portion 61 of the front bracket 51.

To embed the heat passage members 60 in the bracket body 50, the heat passage members 60 may be placed in a metal mold, and then the front bracket 52 formed by injection molding aluminum in the metal mold. Alternatively, bore holes may be machined into the bracket body 50 and the heat passage members 60 inserted into these bore holes.

Like the front bracket 51, the rear bracket 52 also has ribs 54, which comprise copper heat passage members 60 embedded in the bracket body, exhaust windows 29, which are ventilation windows, intake windows 34, which are ventilation windows, and mounting holes 33.

In a vehicle alternator of the above construction, a current is supplied by a battery (not shown) through the brushes 10 and slip ring 9 to the rotor coil 13, and a magnetic flux is generated, whereby the claw-shaped magnetic poles 20 of the first pole core assembly 18 are polarized with a north-seeking (N) pole, and the claw-shaped magnetic poles 21 of the second pole core assembly 19 are polarized with a south-seeking (S) pole. At the same time, the pulley 4 is driven by the engine and the rotor 7 is rotated by the shaft 6, so that a rotating magnetic field is imparted to the stator coil 16 and electromotive force is generated in the stator coil 16. This alternating electromotive force is converted to a direct current by means of the rectifier 12, its magnitude is regulated by the regulator 17, and the battery is recharged.

The rotor coil 13 and stator coil 16 continuously generate heat while they generate power. At the same time, a fan 5 rotates to remove the heat generated by power generation, and in the front bracket 51 and rear bracket 52, cooling air passes in through the intake windows 34 and is expelled to the outside through the exhaust windows 29, as shown by arrows B in FIG. 2.

In the present embodiment, some of the heat generated in the stator coil 16 is transferred to the cooling air as it passes through the exhaust windows 29, and the ribs 54, which constitute part of that heat transfer passage, comprise heat passage members 60 composed of copper, which has high thermal conductivity, and the heat resistance of the heat transfer passage is therefore small compared to conventional ribs 28, which use aluminum. Thus, when the vehicle alternator of the present invention was operated under the same conditions, the temperature of a stator 8 of approximately 200° C. was reduced by 3° C. more than a conventional vehicle alternator.

In the present embodiment, copper was used as the material for the heat passage members 60 which constitute the ribs 54, but when the heat passage members 60 are composed of silver, which has even higher thermal conductivity, the temperature of the stator 8 can be reduced even further. The number of heat passage members, or ribs, may also be increased in order to increase the surface area in contact with the cooling air and to reduce heat resistance in the heat transfer passage.

Furthermore, in the present embodiment, the temperature of the stator 8 was reduced, but in a vehicle alternator constructed such that the commutator heat sink is connected to the rear bracket and the heat generated by the diode is transferred to the rear bracket, the temperature of the diode can be reduced.

Embodiment 2

Figure 4:
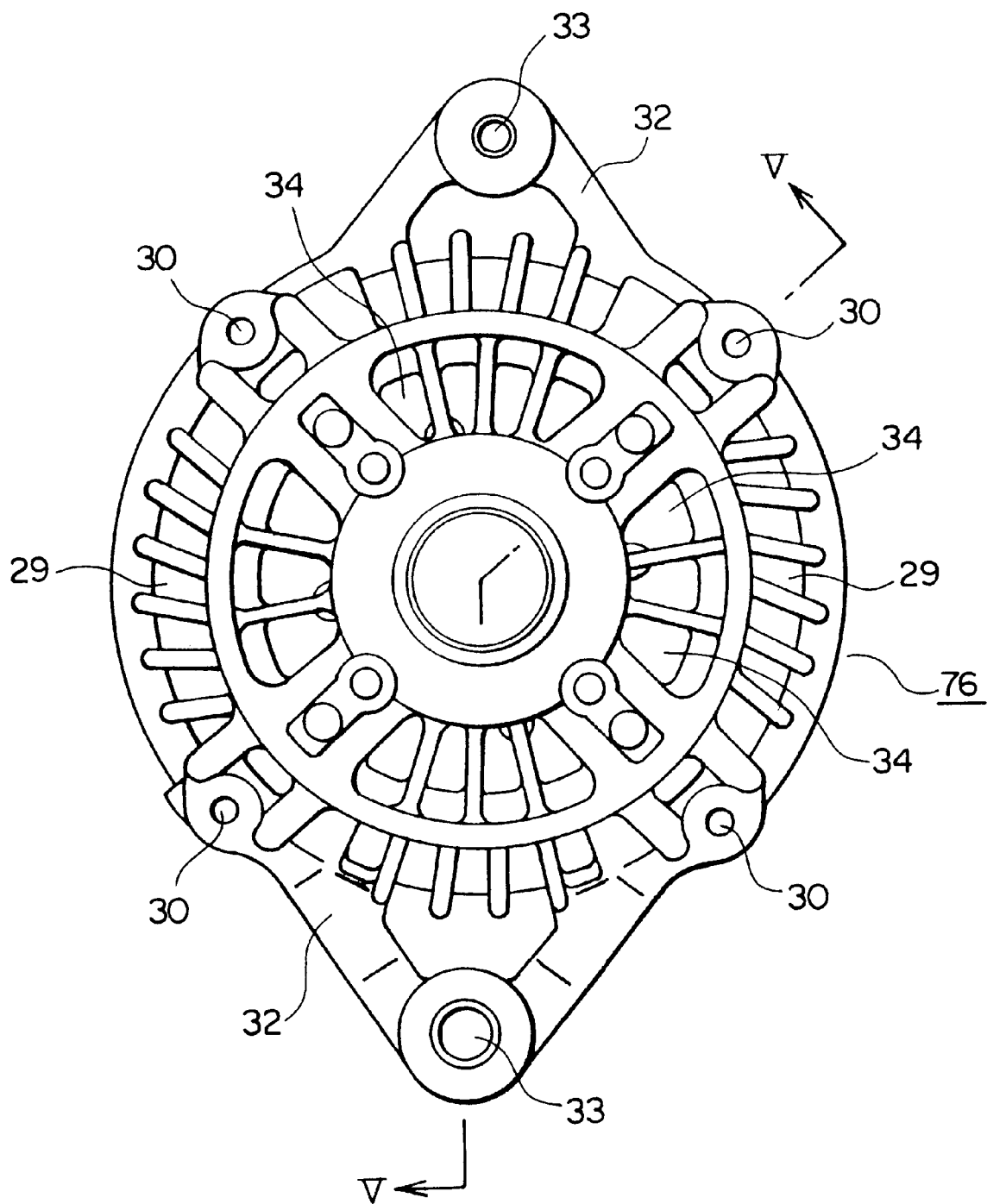
FIG. 4 is a front elevation of the vehicle alternator according to Embodiment 2 of the present invention.
Figure 5:
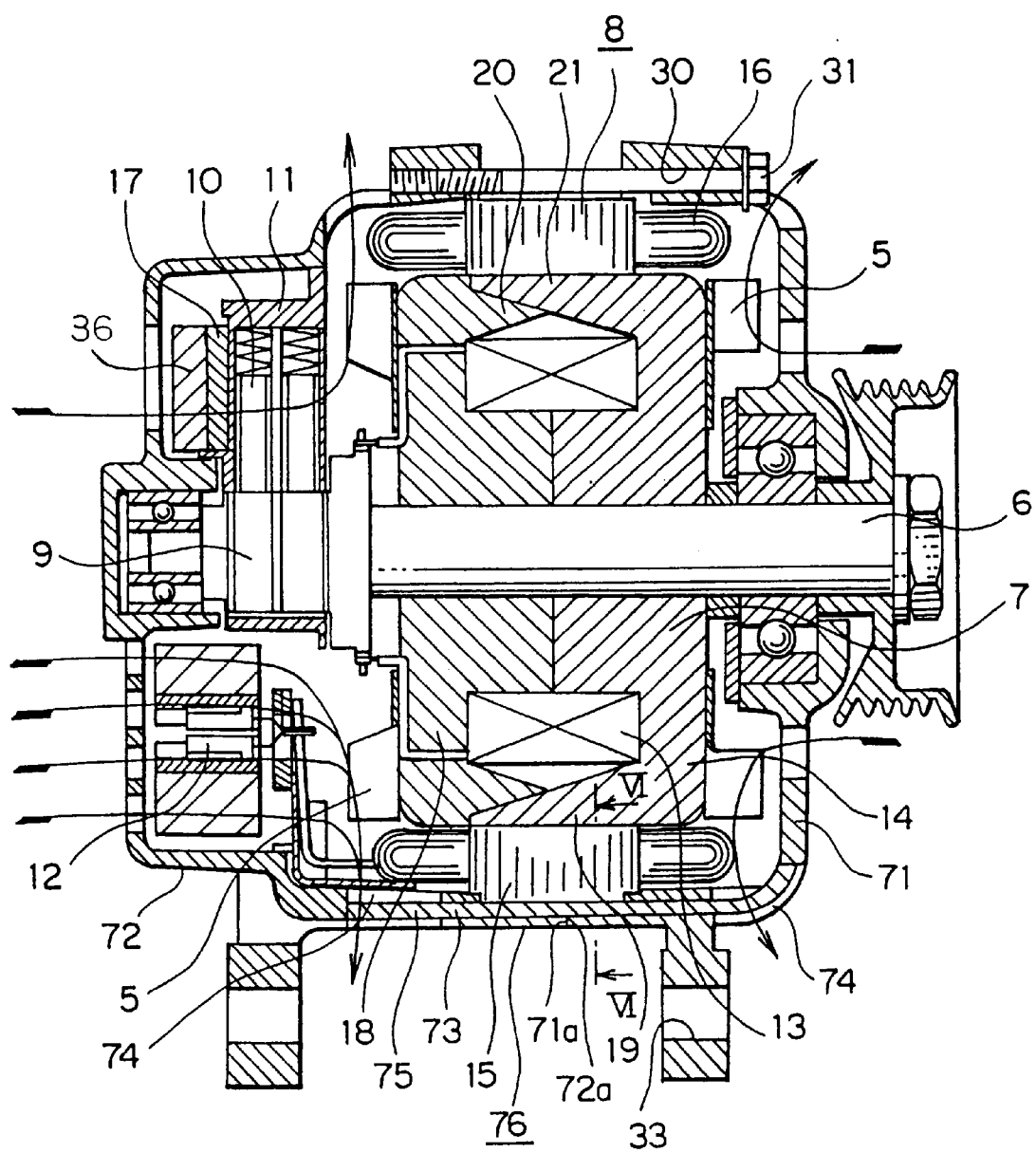
FIG. 5 is a cross-section along line V—V in FIG. 4.
Figure 6:
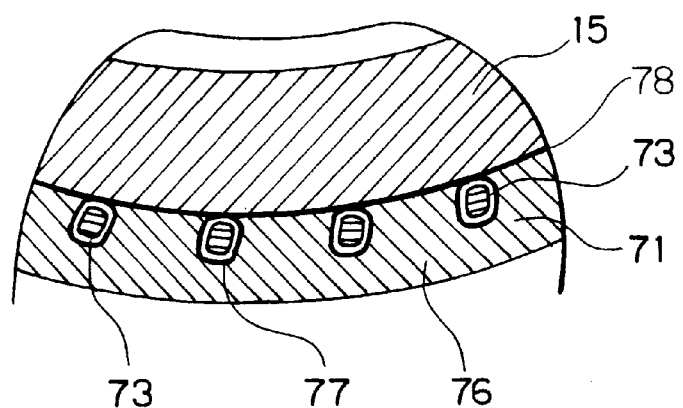
FIG. 6 is a cross-section along line VI—VI in FIG. 5.

FIG. 4 is a front elevation of the vehicle alternator according to Embodiment 2 of the present invention, FIG. 5 is a cross-section along line V—V in FIG. 4, and FIG. 6 is a cross-section along line VI—VI in FIG. 5. The pulley and shaft in FIG. 5 have been omitted in FIG. 4.

Figure 7:
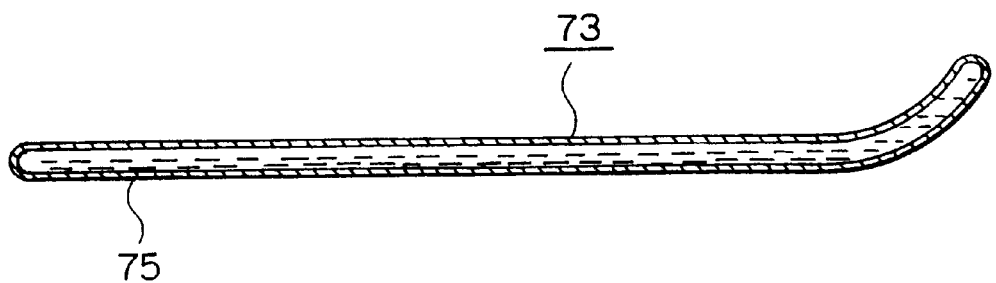
FIG. 7 is a cross-section of the heat pipe in FIG. 5.
Figure 8:
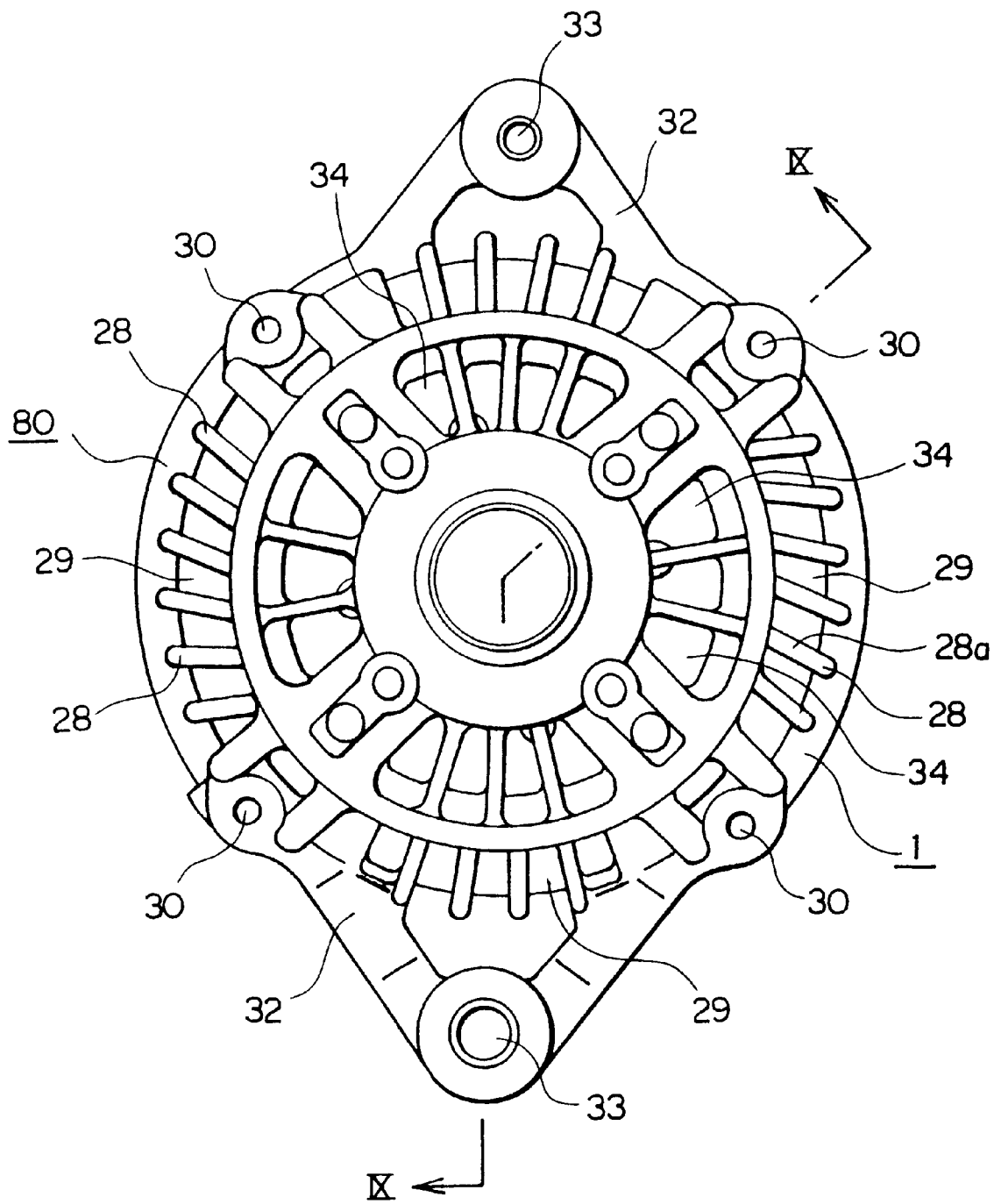
FIG. 8 is a front elevation of a conventional vehicle alternator.
Figure 9:
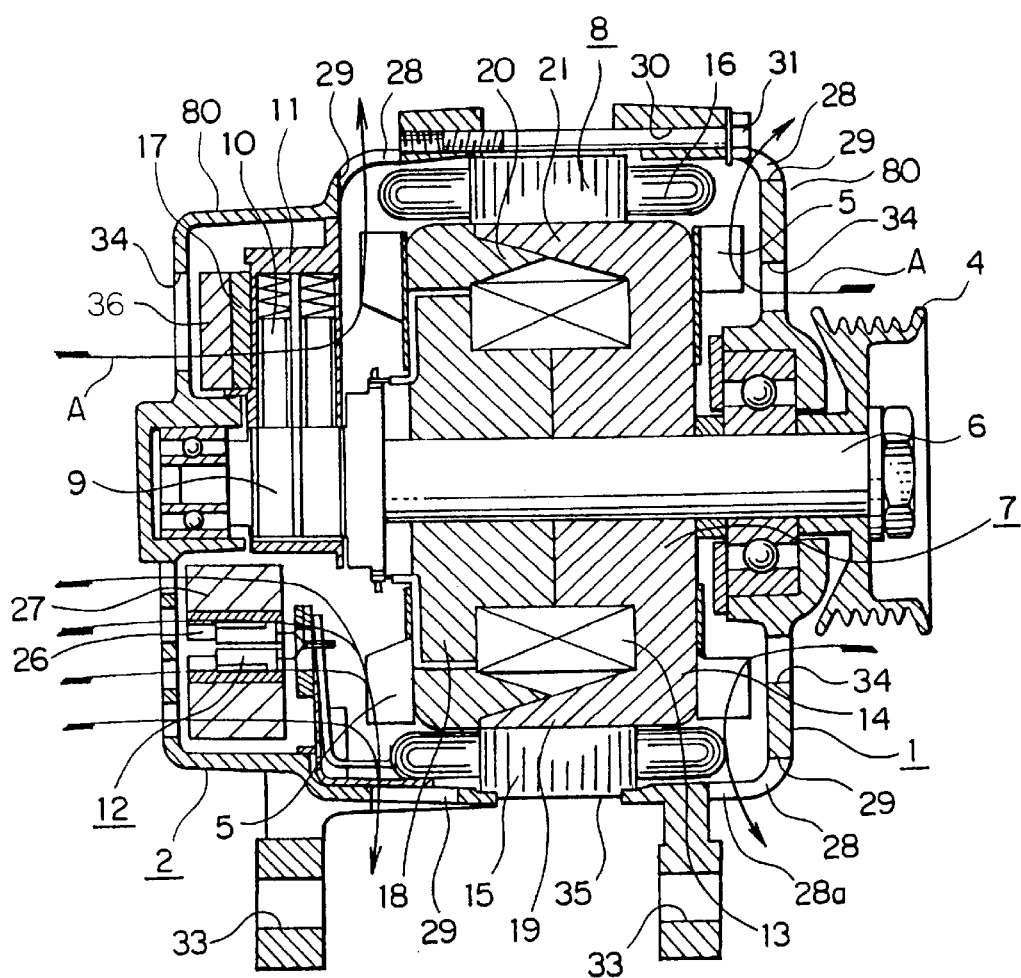
FIG. 9 is a cross-section along line IX—IX in FIG. 8.
Figure 10:
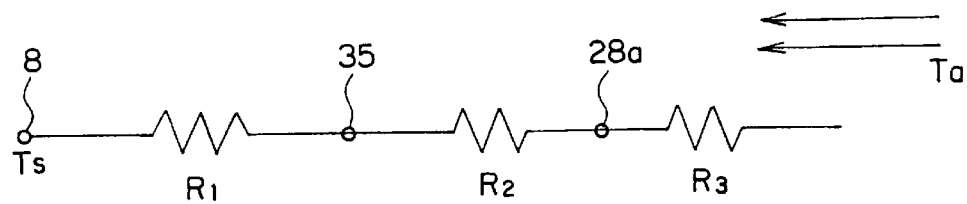
FIG. 10 is a diagram of the heat transfer circuit of a vehicle alternator.

In the present embodiment, the edges 71a, 72a of a bowl-shaped front bracket 71 and a bowl-shaped rear bracket 72 are in contact with each other except for the vicinity where the bolt 31 of the front bracket 71 and the rear bracket 72 passes through, and the front bracket 71 and the rear bracket 72 are in contact with the outer circumferential surface of the stator core 15. Also, sections of heat pipes 73, which are heat transfer passages, are embedded in the bracket body 76 in the front bracket 71 and the bracket body 76 in the rear bracket 72. As shown in FIG. 7, one end of each long narrow heat pipe 73 constitutes a rib 75 of an exhaust window 74 in the front bracket 71, and the other end constitutes a rib 75 of a window frame of an exhaust window 74 in the rear bracket 72.

The heat pipes 73 are heat transfer elements, which have a thermal conductivity one hundred times that of copper, and each comprises a copper pipe, whose inner wall has been formed with a capillary tube construction (wick construction), the inside of which is evacuated and filled with a small amount of water, etc., as a working liquid.

Silicon grease 77, which is an air-excluding medium, is interposed between the bracket body 76 and each of the heat pipes 73. By interposing the silicon grease 77, air is excluded from between the bracket body 76 and each of the heat pipes 73 and heat resistance between the bracket body 76 and each of the heat pipes 73 is reduced. Air-excluding silicon grease 78 is also interposed between the outer circumferential surface of the stator core 15 and the inner circumferential surface of the bracket body 76.

In the present embodiment, by using heat pipes 73 of high thermal conductivity, increasing the surface area in contact between the stator core 15 and the brackets 71, 72, also interposing silicon grease between the outer circumferential surface of the stator core 15 and the bracket body 76, and further interposing silicon grease between the heat pipes 73 and the bracket body 76, the temperature of a stator 8 of approximately 200° C. was reduced by 30° C. more than a conventional vehicle alternator.

As explained above, in the vehicle alternator of the present invention, the ribs comprise heat passage members having higher thermal conductivity than the bracket body and being partially embedded in the bracket body. Therefore, heat resistance in the heat transfer passage between the stator and the ventilation windows is reduced, and heat generated by the stator is therefore expelled efficiently from the ventilation windows to the outside air, and the temperature of the stator can be reduced.

The edges of a pair of brackets may be in contact, and the surface of the inner wall of the case may be in contact with the outer circumferential surface of the stator core. Therefore, the surface area in contact between the case and the stator core is increased, and heat resistance in the heat transfer passage between the stator and the ventilation windows is reduced, and heat generated by the stator is therefore expelled even more efficiently from the ventilation windows to the outside air.

One end of each of the heat passage members may constitute a rib in one of the brackets, and the other end of each of the heat passage members may constitute a rib in the other of the brackets. Therefore, heat resistance in the heat transfer passage between the stator and the ventilation windows is reduced, and heat generated by the stator is therefore expelled even more efficiently from the ventilation windows to the outside air.

The bracket body may be composed of aluminum and the heat passage members may be composed of copper. Therefore, a vehicle alternator with excellent stator heat dissipation can be provided at low cost.

The heat passage members may be heat pipes. Therefore, heat resistance in the heat transfer passage between the stator and the ventilation windows is reduced markedly, and heat generated by the stator is therefore expelled even more efficiently from the ventilation windows to the outside air.

The air-excluding medium which reduces heat resistance between the stator core and the case may be interposed between the stator core and the case. Therefore, air, which is highly heat-resistant, does not interpose between the stator core and the case, and heat resistance between the stator core and the case can therefore be reduced.

The air-excluding medium which reduces heat resistance between each of the heat passage members and the bracket body may be interposed between the heat passage members and the bracket body. Therefore, air, which is highly heat-resistant, does not interpose between the heat passage members and the bracket body, and heat resistance between the heat passage members and the bracket body can therefore be reduced.

The air-excluding medium may be silicon grease. Therefore, air, which is highly heat-resistant, can be removed from the heat transfer passage at low cost.

What is claimed is:

1. A vehicle alternator, comprising:
 a case which comprises a pair of brackets placed back-to-back, in which
 ribs are disposed, which define ventilation windows in a bracket body;
 a shaft disposed in said case such that it can rotate freely;
 a rotor secured to said shaft and having a rotor coil which generates a magnetic flux when an electric current is passed through it, and a pole core disposed so as to cover said rotor coil and in which magnetic poles are produced by the magnetic flux generated by said rotor coil; and a stator secured within said case and having a stator core and a stator coil comprising a conductor wound around said stator core and in which an alternating current is generated by a rotating magnetic field of said rotor coil resulting from the rotation of said rotor;

wherein said ribs comprise heat passage members which have a higher thermal conductivity than said bracket body and are partially embedded in said bracket body.

2. The vehicle alternator according to claim 1, wherein said case comprises a pair of said brackets whose edges are in contact, and wherein a surface of an inner wall of said case is in contact with an outer circumferential surface of said stator core.

3. The vehicle alternator according to claim 1, wherein one end of each of said heat passage members constitutes a rib in one of said brackets, and the other end of each of said heat passage members constitutes a rib in the other of said brackets.

4. The vehicle alternator according to claim 1, wherein said bracket body is composed of aluminum and said heat passage members are composed of copper.

5. The vehicle alternator according to claim 1, wherein said heat passage members are heat pipes.

6. The vehicle alternator according to claim 5, wherein said heat pipes are filled with water.

7. The vehicle alternator according to claim 1, wherein air is excluded from between said stator core and said case, and an air-excluding medium, which reduces heat resistance between said stator core and said case, is interposed between said stator core and said case.

8. The vehicle alternator according to claim 7, wherein said air-excluding medium is silicon grease.

9. The vehicle alternator according to claim 1, wherein air is excluded from between each of said heat passage members and said bracket body, and an air-excluding medium, which reduces heat resistance between each of said heat passage members and said bracket body, is interposed between each of said heat passage members and said bracket body.

10. The vehicle alternator according to claim 1, wherein said ribs extend radially and axially relative to an axis of said alternator coincident with a central axis of said shaft, but not circumferentially.

* * * * *